United States Patent Office 3,402,164
Patented Sept. 17, 1968

3,402,164
PROCESS FOR POLYMERIZING ISOBUTYLENE
AND CATALYST COMPOSITION THEREFOR
Mitsuji Miyoshi, Kawasaki-shi, Seiichi Uemura, Tokyo, Shozo Tsuchiya, Kawasaki-shi, and Osamu Kato, Yokohama-shi, Japan, assignors to Nippon Oil Company, Limited, Tokyo, Japan
No Drawing. Filed Aug. 23, 1965, Ser. No. 481,934
Claims priority, application Japan, Aug. 25, 1964, 39/47,810
10 Claims. (Cl. 260—94.8)

ABSTRACT OF THE DISCLOSURE

A catalyst for the homopolymerization of isobutylene or for its copolymerization with one or more copolymerizable monomers, the catalyst being a composition comprising boron trifluoride and an alkoxide of a metal selected from the transition metals of Group VIII of the Periodic Table.

---

The present invention relates to a process for polymerizing isobutylene, and more particularly, a process for preparing a homopolymer or copolymer of isobutylene using a novel catalyst composition.

Heretofore, it is well known that a polyisobutylene having a high molecular weight may be obtained by polymerizing a monomeric isobutylene in the presence of a metal halide such as Friedel-Crafts catalysts. However, with the use of this type of catalyst, a high molecular weight polymer of isobutylene is obtainable only at extremely low temperatures and it is impossible to obtain such a high molecular weight polymer at a high temperature. The reason is that the chain-transferring and chain-terminating reactions actively occur at a high temperature in the case of such catalysts. For instance, in the process of producing butyl rubber by copolymerizing isobutylene and a minor portion of isoprene using aluminum trichloride catalyst, a temperature as low as $-100°$ C. is required.

It goes without saying that the requirement for a severe temperature condition is undesirable both from a practical and an economical point of view, therefore, various attempts have been made to achieve the desirous end of obtaining a polymer having a high degree of polymerization at relatively high temperature near the ambient temperature.

There have been proposed, for example, the following processes for polymerizing isobutylene to obtain a high molecular weight polymer at relatively high temperature, for instance, process for polymerizing isobutylene in a polar solvent in the presence of diethyl aluminum chloride as a catalyst; a process using a catalyst composition consisting of boron trifluoride and an organometallic compound; a process using a ternary catalyst composition consisting of aluminum tri-tert-butoxide, boron trifluoride and titanium tetrachloride; and a process using a catalyst composition consisting of tin tetrachloride and diethyl aluminum chloride.

We have discovered that a novel binary catalyst composition entirely different from the prior art, which comprises an alkoxide of a metal selected from the transition metals of Group VIII of the Periodic Table and boron trifluoride, produces isobutylene polymers of a high degree of polymerization and produces a high molecular weight isobutylene polymer at a temperature even as high as $-10°$ C., as compared with the independent use of Friedel-Crafts catalysts known heretofore, and the present invention has been accomplished on the basis of these discoveries.

An object of the present invention is to provide a process for producing isobutylene homopolymer or copolymer having a high degree of polymerization.

Another object of the present invention is to provide a novel catalyst composition suitable and effective for producing isobutylene homopolymer or copolymer having a high degree of polymerization at a high temperature near the ambient temperature.

These objects mentioned hereinabove may be accomplished by the process of the present invention which comprises polymerizing isobutylene or a monomeric mixture consisting of isobutylene and at least a monomer copolymerizable therewith in the presence of a novel catalyst composition comprising boron trifluoride and an alkoxide of a metal selected from the transition metals of Group VIII of the Periodic Table to form a homopolymer or copolymer of isobutylene.

The alkoxides of transition metals of Group VIII of the Periodic Table which may be used in the process of the present invention may be represented by the formula

$$M(OR)_m$$

wherein R represents a member selected from the group consisting of alkyl, cycloalkyl, aryl, aralkyl and alkaryl groups and halides thereof, and M is a member selected from the transition metals of Group VIII of the Periodic Table such as Fe, Co, Ni, Ru, Rh, Pd, Os, Ir and Pt. Further, $m$ is an integer which indicates the valency of metal M.

While the mechanism by which the successful results are obtained in accordance with the present catalyst composition is not completely understood, it is believed that these metal alkoxides, which are not considered to be cation polymerization catalysts capable of polymerizing isobutylene by themselves, form a new type of catalyst composition entirely different from Friedel-Crafts catalyst known heretofore in combination with boron trifluoride.

Among the suitable radicals represented by the symbol R in said formula are: alkyl as exemplified by methyl, ethyl, n-propyl, isopropyl, n-butyl, isobutyl, sec-butyl and tert-butyl; aryl as exemplified by phenyl, naphthyl and phenanthryl; aralkyl as exemplified by benzyl, 2-phenylethyl and 3-phenyl-propyl; and alkaryl as exemplified by o-, m-, p-tolyl and xylyl.

As for the proportion of the components of the catalyst composition in accordance with the present invention, the amount of metal alkoxide is from 0.001 to 10 mol percent, preferably from 0.01 to 1 mol percent, based on monomeric isobutylene, and 0.5 to 10 mol of boron trifluoride per mol of metal alkoxide.

Upon practicing the present invention, either bulk polymerization or solution polymerization are applicable. As the solvent for solution polymerization, aliphatic hydrocarbons, aromatic hydrocarbons, alkyl halides or aryl halides may be utilized, however, inert hydrocarbons, particularly aliphatic hydrocarbons, for instance, ethane, propane, butane, pentane, hexane, petroleum ether, naphtha, etc., are effectively used.

The monomers which are copolymerizable with isobutylene according to the process of the present invention are various mono- or di-olefins, such as 1-butene, 2-butene, butadiene, isoprene, cyclopentadiene, styrene, α-methylstyrene, etc., and any other monomeric compounds polymerizable by cation polymerization.

The outstanding feature of the polymerization according to the process of the present invention is that unlike Friedel-Crafts catalyst known heretofore, such as metal halides, there is produced a high molecular weight isobutylene polymer at temperature as high as $-10°$ C.

Another remarkable feature of the present invention is that in the polymerization using the novel catalyst, a high molecular weight isobutylene polymer is produced at relatively high temperature and further the molecular weight of the polymer obtained by polymerizing isobutylene in the presence of the catalyst composition of the present invention increases as the polymerization temperature decreases, thus, the polymerization temperature may be selected optionally within an extremely wide range depending upon the desired molecular weight of the polymer.

The present invention may be better understood in the following examples. However, it should not be construed that these examples restrict the present invention in any event, inasmuch as many apparently widely different embodiments of the present invention may be made without departing from the spirit and scope thereof.

Examples 1–5

The catalyst is prepared by bubbling boron trifluoride into 0.2 mol of iron tri-n-butoxide dissolved per liter of benzene and absorbing 2 mols of boron trifluoride per mol of iron tri-n-butoxide.

Said catalyst in the amount specified in the following Table 1 is added to a reactor containing isobutylene and n-hexane, and, after polymerizing same in the number of hours listed in the Table 1 in quiescence, the reaction is stopped by adding isopropylalcohol. The resultant polymer is washed out several times with isopropanol, and after drying same in a vacuum at 60° C. for 24 hours, a white rubber-like polymer is obtained. The results in detail are given in Table 1.

TABLE 1

| Example | Amount of catalyst used (mmol/l. measured as Fe(O-n-C$_4$H$_9$)$_3$) | Isobutylene (percent by volume) | Polymerization Period (hour) | Polymerization Temperature (° C.) | Yield (percent) | Viscosity Average Molecular Weight* |
|---|---|---|---|---|---|---|
| 1 | 5.0 | 10 | 2 | −10 | 72 | 151,000 |
| 2 | 10.0 | 10 | 2 | −60 | 50.5 | 1,303,000 |
| 3 | 5.0 | 15 | 1 | −30 | 62.8 | 352,000 |
| 4 | 30.0 | 10 | 2 | −20 | 100 | 143,000 |
| 5 | 10.0 | 30 | 2 | −20 | 87 | 150,000 |

*As measured by method described in "Molecular Weights and Intrinsic Viscosities of Polyisobutylene," P. J. Flory, J.A.C.S., volume 65, No. 3, page 379 (1943).

Examples 6–9

Isobutylene is polymerized under the same conditions as in Examples 1–5 except that the catalyst was prepared by saturating boron trifluoride in 0.2 mol of iron triethoxide Fe(O-C$_2$H$_5$)$_3$ dissolved per liter of benzene. The results are indicated in Table 2.

TABLE 2

| Example | Amount of catalyst used (mmol/l. measured as Fe(O-C$_2$H$_5$)$_3$) | Isobutylene (percent by volume) | Polymerization Period (hour) | Polymerization Temperature (° C.) | Yield (percent) | Molecular Weight |
|---|---|---|---|---|---|---|
| 6 | 8 | 20 | 2 | −50 | 66.1 | 401,000 |
| 7 | 3 | 15 | 1 | −20 | 56.9 | 121,000 |
| 8 | 7.5 | 10 | 2 | −20 | 96.2 | 143,000 |
| 9 | 10 | 15 | *10 | −10 | 64.7 | 88,000 |

*Minutes.

Example 10

The catalyst is prepared by bubbling boron trifluoride into 0.2 mol of iron tri-tert-butoxide Fe(O-tert-C$_4$H$_9$)$_3$ dissolved per liter of benzene until saturation. 0.1 cc. of said catalyst is added into a reactor containing 26 cc. of n-hexane and 3 cc. of isobutylene at a temperature of −50° C. and after polymerizing isobutylene is quiescence for 2 hours, a white rubber-like polymer having a molecular weight of 790,000 is obtained at a yield of 70.1%.

Example 11

A dispersion in which a yellowish-brown powdery precipitate is dispersed is obtained by bubbling boron trifluoride into 0.2 mol of iron tri-n-butoxide Fe(O-n-C$_4$H$_9$)$_3$ dissolved per liter of n-hexane until it reaches saturation.

A reactor having a capacity of 1 liter and provided with an air-tight stirrer, a thermometer, a reflux condenser, a catalyst inlet, an isobutylene inlet, and an inlet and outlet for nitrogen gas, is filled with 700 cc. of dehydrated propane and 300 cc. of dehydrated isobutylene which is then cooled to −42° C. 15 cc. of the aforementioned dispersion is added to said mixture in an atmosphere of dried nitrogen gas by means of a syringe and polymerization is carried out for an hour while stirring and maintaining the temperature at −42.5° C. 197 grams of a white rubber-like polymer having a molecular weight of 620,000 is obtained.

Example 12

Polymerization is carried out for 2 hours in quiescence in a reactor containing 5.4 g. of isobutylene, 0.1 g. of isoprene and 20 cc. of n-hexane, which is kept at a temperature of −20° C., in the presence of 1.8 g. of the catalyst prepared in Example 1, and 2.3 g. of a white rubber-like polymer having a molecular weight of 97,000 is obtained. The degree of unsaturation of said resultant polymer is measured as 1.0%, in accordance with the iodine titration method in the presence of mercurous acetate as described in the article McNall et al., Anal. Chem., Volume 29, page 951 (1857).

Example 13

A mixture containing 30 g. of isobutylene, 450 cc. of n-hexane and 0.5 mmol of cobalt di-n-butoxide Co(O-n-C$_4$H$_9$)$_2$ is cooled to −20° C., and 36.4 cc. of boron trifluoride is led thereinto through a gas-buret and reacted for an hour. 28.1 g. of a white rubber-like polymer having a molecular weight of 124,000 is obtained.

Example 14

The catalyst is prepared by saturating boron trifluoride in 0.2 mol of nickel diethoxide Ni(OC$_2$H$_5$)$_2$ dissolved per liter of toluene and 3 cc. of said catalyst is added to a mixture of 10 cc. of isobutylene and 90 cc. of toluene which is cooled to −30° C., and then polymerization is carried out for an hour thereby obtaining 8.7 g. of a white rubber-like polymer.

What we claim is:

1. A process for preparing an isobutylene homopolymer which comprises polymerizing isobutylene in the presence of a catalyst composition comprising boron trifluoride and an alkoxide of a metal selected from the transition metals of Group VIII of the Periodic Table.

2. A process for preparing an isobutylene copolymer which comprises polymerizing isobutylene and at least one monomer copolymerizable therewith in the presence of a catalyst composition comprising boron trifluoride and an alkoxide of a metal selected from the transition metals of Group VIII of the Periodic Table.

3. A process according to claim 2 wherein said monomer is selected from the group consisting of 1-butene, 2-butene, butadiene, isoprene, cyclopentadiene, styrene and α-methylstyrene.

4. A catalyst composition for polymerizing isobutylene comprising boron trifluoride and an alkoxide of a metal selected from the transition metals of Group VIII of the Periodic Table.

5. A catalyst composition for copolymerizing isobutylene and at least one monomer copolymerizable therewith comprising boron trifluoride and an alkoxide of a metal selected from the transition metals of Group VIII of the Periodic Table.

6. A process according to claim 1 wherein said metal alkoxide is represented by the formula $$M(OR)_m$$

wherein R is a member selected from the group consisting of alkyl, cycloalkyl, aryl, aralkyl and alkaryl groups and halides thereof, M is the metal selected from the transition metals of Group VIII of the Periodic Table, and m is an integer which indicates the valency of metal M.

7. A catalyst composition according to claim 5 wherein said metal alkoxide is represented by the formula $$M(OR)_m$$

wherein R is a member selected from the group consisting of alkyl, cycloalkyl, aryl, aralkyl and alkaryl groups and halides thereof, M is the metal selected from the transition metals of Group VIII of the Periodic Table, and m is an integer which indicates the valency of metal M.

8. A process according to claim 1 wherein said metal alkoxide is represented by the formula:

$$M(OR)_m$$

wherein R is a member selected from the group consisting of alkyl, cycloalkyl, aryl, aralkyl and alkaryl groups and halides thereof, M is Fe, Co, Ni, Ru, Rh, Pd, Os, Ir or Pt, and m is an integer which indicates the valency of metal M.

9. A process according to claim 2 wherein said metal alkoxide is represented by the formula:

$$M(OR)_m$$

wherein R is a member selected from the group consisting of alkyl, cycloalkyl, aryl, aralkyl and alkaryl groups and halides thereof, M is Fe, Co, Ni, Ru, Rh, Pd, Os, Ir or Pt, and m is an integer which indicates the valency of metal M.

10. A catalyst composition according to claim 6 wherein said metal alkoxide is represented by the formula:

$$M(OR)_m$$

wherein R is a member selected from the group consisting of alkyl, cycloalkyl, aryl, aralkyl and alkaryl groups and halides thereof, M is a member selcted from the transition metals of Group VIII of the Periodic Table, and m is an integer which indicates the valency of metal M.

No references cited.

JOSEPH L. SCHOFER, *Primary Examiner.*

R. A. GAITHER, *Assistant Examiner.*